(12) United States Patent
Hodgson et al.

(10) Patent No.: US 7,956,296 B2
(45) Date of Patent: Jun. 7, 2011

(54) TRANSPORT SYSTEM

(75) Inventors: Ian Hodgson, Birmingham (GB); David Morgan, Dorset (GB)

(73) Assignee: Ishida Europe Limited, Birmingham (GB)

( * ) Notice: Subject to any disclaimer, the term of this patent is extended or adjusted under 35 U.S.C. 154(b) by 455 days.

(21) Appl. No.: 11/884,127

(22) PCT Filed: Feb. 9, 2006

(86) PCT No.: PCT/GB2006/000449
§ 371 (c)(1),
(2), (4) Date: May 14, 2008

(87) PCT Pub. No.: WO2006/085076
PCT Pub. Date: Aug. 17, 2006

(65) Prior Publication Data
US 2008/0264698 A1 Oct. 30, 2008

(30) Foreign Application Priority Data
Feb. 10, 2005 (GB) .................................. 0502777.6

(51) Int. Cl.
G01G 19/00 (2006.01)
(52) U.S. Cl. ........................................................ 177/145
(58) Field of Classification Search .................. 177/145, 177/146
See application file for complete search history.

(56) References Cited

U.S. PATENT DOCUMENTS

| 2,597,069 | A | * | 5/1952 | Conti | 177/154 |
| 3,545,588 | A | * | 12/1970 | Corley | 198/345.1 |
| 3,878,909 | A | * | 4/1975 | Treiber | 177/145 |
| 4,238,027 | A | | 12/1980 | Oelte | |
| 4,709,770 | A | * | 12/1987 | Kohashi et al. | 177/50 |
| 5,046,570 | A | * | 9/1991 | Emme et al. | 177/145 |
| 5,256,835 | A | * | 10/1993 | Rydzak | 177/145 |
| 5,306,877 | A | * | 4/1994 | Tas | 177/145 |
| 6,396,002 | B1 | | 5/2002 | Hove et al. | |
| 6,559,391 | B2 | * | 5/2003 | Huebler et al. | 177/25.15 |
| 7,045,721 | B1 | * | 5/2006 | Green et al. | 177/146 |

FOREIGN PATENT DOCUMENTS

| DE | 100 10 543 | 9/2001 |
| GB | 1180030 | 2/1970 |

OTHER PUBLICATIONS

International Search Report of International Published Application No. PCT/GB2006/000449 (mailed Oct. 5, 2006).

* cited by examiner

Primary Examiner — Randy W Gibson

(57) ABSTRACT

A transport system for transporting articles along a transport path having a plurality of pusher members coupled to a control mechanism for moving the pusher members along the transport path. A support for supporting articles as they are pushed by the pusher members extends along the transport path, and a weighing system includes a weighing member supported on a weight detection device. The weighing member is adapted to transfer an article from the support to the weighing member and out of contact with the pusher members.

7 Claims, 3 Drawing Sheets

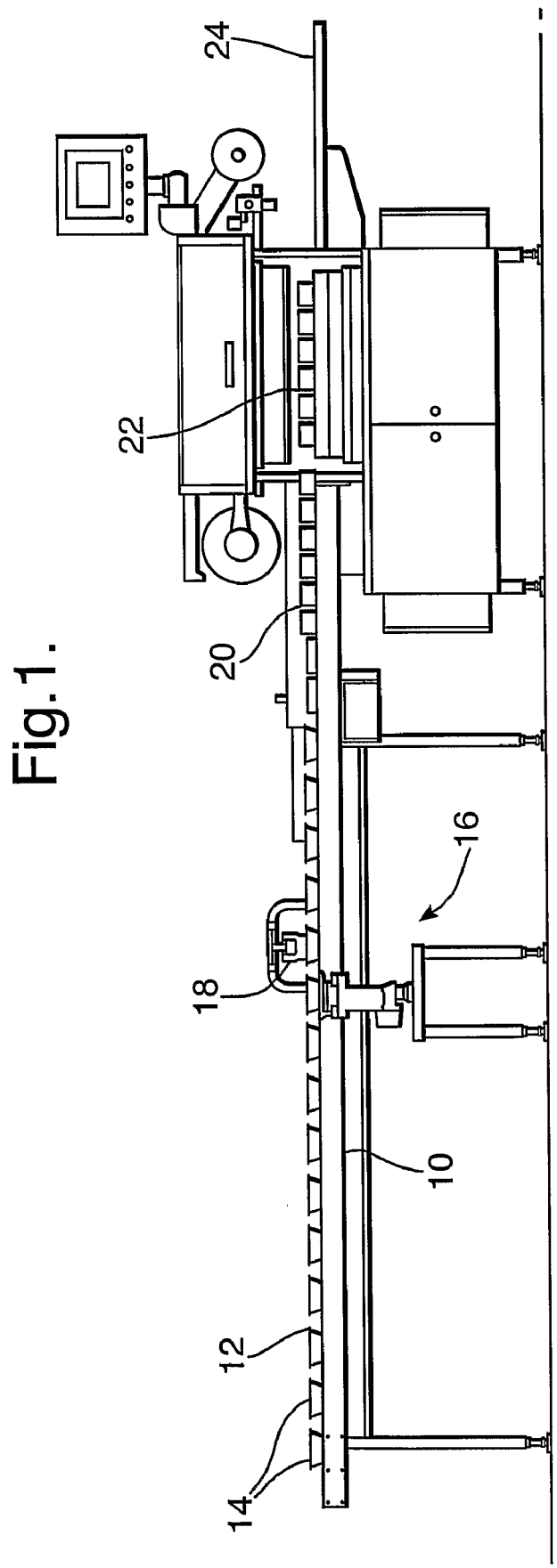

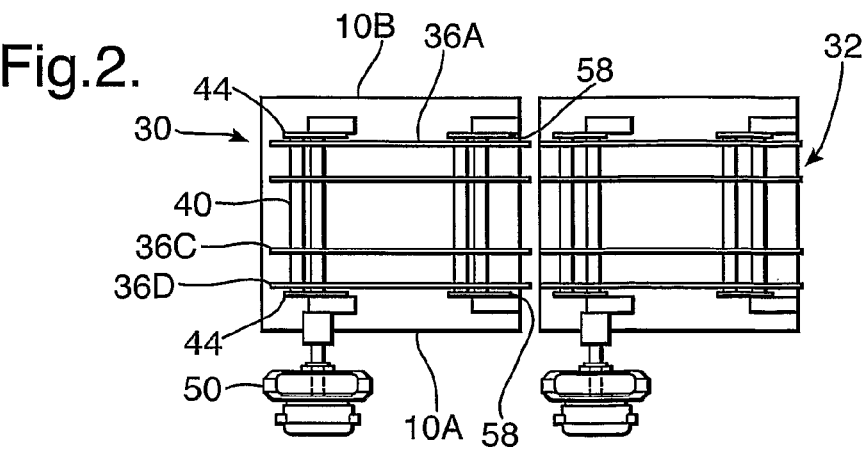
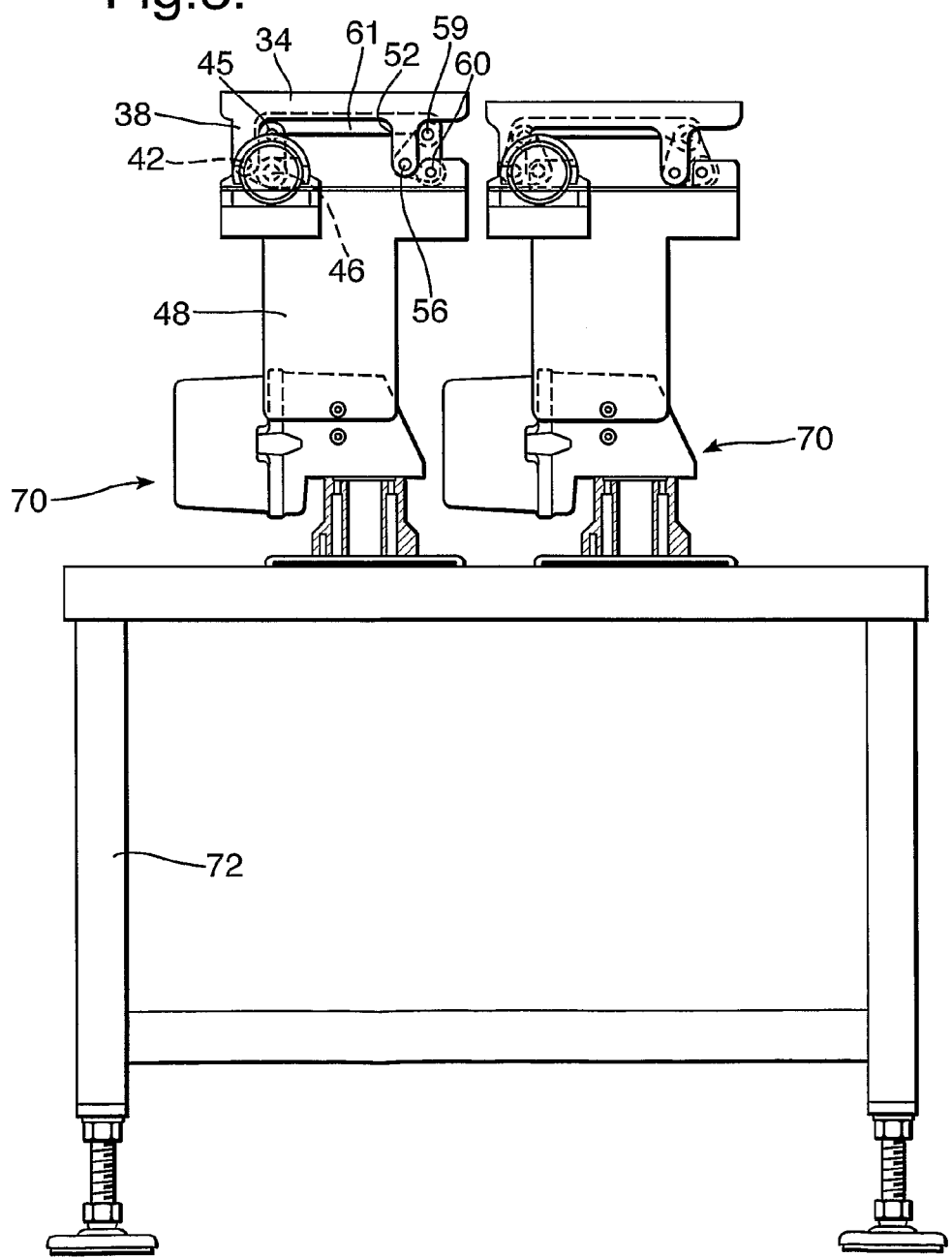

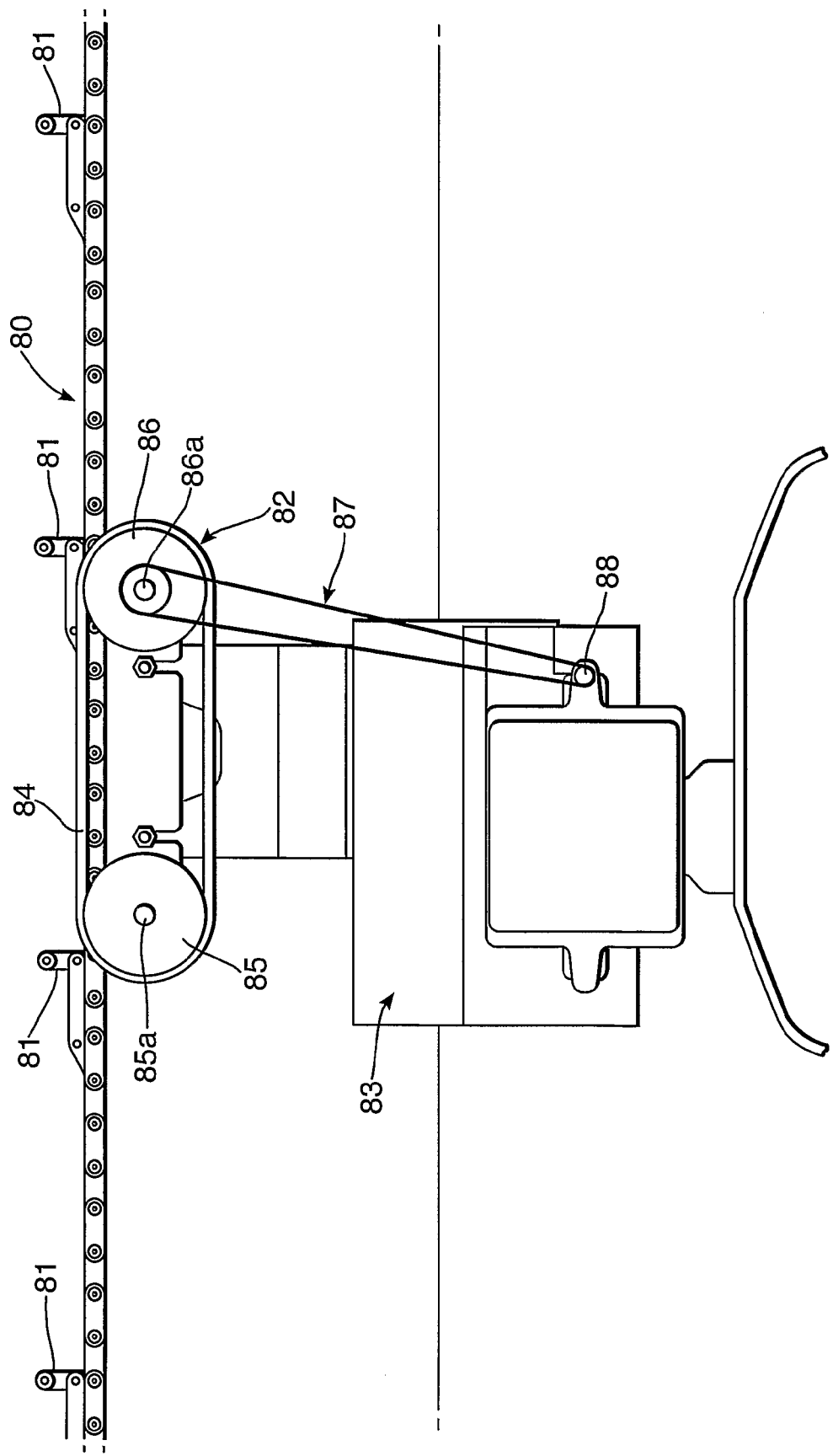

ured weight.

TRANSPORT SYSTEM

CROSS REFERENCE TO RELATED APPLICATIONS

This application is based on and claims priority to International Application PCT/GB2006/000449 filed Feb. 9, 2006 and Great Britain Application No. 0502777.6 filed Feb. 10, 2005, the disclosures of which are hereby incorporated herein by reference.

The invention relates to a transport system for transporting articles, for example trays which contain foodstuffs such as snack products, along a transport path.

The Ishida Qualitech tray sealer transports open topped trays from a tray filling system in which a food product is loaded into the tray to a tray sealing system in which a plastic cover is heat sealed to the tray.

The tray sealer includes a transport system formed by a sequence of upright pins coupled via an endless chain which push respective trays along a pair of laterally spaced support bars. The system can be operated continuously or intermittently as required.

Recently, there has been a need to confirm that the tray has been correctly filled with product before it is sealed. We therefore incorporated a check weigher into the transport system. Our solution was to make a small section of the support bars independent of the remainder of the support bars and to attach the small section to a load cell so that as a tray was placed onto the small section, it could be weighed. One problem with this is that the transport system requires a pair of laterally spaced guide bars to stop trays sliding off the support bars and the tray remains in contact with those guides as it is being weighed and thus an error weight might result. In addition, the tray may remain in contact with the pusher member which again will lead to an error in the measured weight.

In accordance with a first aspect of the present invention, we provide a transport system for transporting articles along a transport path, the system comprising a plurality of pusher members coupled to a control mechanism for moving the pusher members along the transport path; a support extending along the transport path for supporting articles as they are pushed by the pusher members; and a weighing system including a weighing member supported on a weight detection device, wherein the weighing member is adapted to transfer an article from the support to the weighing member and out of contact with the pusher members.

In this invention, the article, such as a tray, is effectively lifted off the support by the weighing member and thus the support does not interfere with the article when it is being weighed. Furthermore, since typical articles such as trays have a tapered side wall, the act of lifting the article off the support would also increase the distance between adjacent pusher members and the article.

In one embodiment, the support is fixed and the weighing member is movable relative to the support between a rest position below the support and a weighing position in which it protrudes above the support so as to lift an article off the support.

In order to minimize the risk of contact between the article and the pusher member, preferably the weighing system includes a weighing member moving system for moving the weighing member with both vertical and forward direction components, with respect to the direction of movement of the pusher members, as it is moved from the rest position to the weighing position.

With this arrangement, the article is lifted up and forward relative to the pusher member. This is particularly convenient if the pusher members are operated intermittently but could also be utilized where the pusher members are operated continuously. For example, the weighing process can be made relatively short (as explained below) and thus the pusher members, such as upright pins or plates, will not have moved significantly while the article is out of contact with the support. Alternatively, the pusher member control could be slowed down slightly during the weighing process.

The combination of vertical and forward movement could be achieved in a variety of ways using X, Y mounting mechanisms or the like. Preferably, however, the weighing member moving mechanism comprises one or more arms pivotally mounting the weighing member to a base member. This provides a very simple way of achieving the desired movement with a minimum of mechanical components.

We have further discovered that the amount of relative movement between the weighing member and the support can be made very small, typically not more than 15 mm and preferably in the range 10-15 mm. This is enough to prevent interference between the support or guide system and the article. It has the advantage that the weighing system only needs a short time in the order of 200-300 milliseconds to stabilize.

A further advantage of this embodiment of the invention is that when the weighing member is in its retracted position, it is possible to calibrate the weighing system for zero load.

Typically, the weight detection device comprises a load cell although other conventional detection devices could also be used. A strain gauge is normally fitted to the load cell to provide an electrical signal indicative of the load on the weight detection device.

Conveniently, the relative movement between the weighing member and the support is pneumatically controlled although other known control systems such as servomotors or hydraulic control could also be used.

In another embodiment, the control mechanism is adapted to move the pusher members continuously at a first speed, and the weighing member includes a conveyor adapted to convey an article in the direction of transport at a second speed, which is faster than the first speed.

The conveyor may comprise an endless belt entrained around a pair of rollers, and the support may then extend along the transport path adjacent the endless belt.

Alternatively, the conveyor may comprise at least two laterally spaced endless belts entrained around a pair of rollers.

In this case, the support can extend along the transport path through the one or more lateral spaces between the endless belts.

Typically, the conveyor conveys an article at a height above the support.

In either embodiment, the support preferably comprises two or more laterally spaced bars.

In either embodiment, the control mechanism comprises a continuous chain to which the pusher members are connected.

In either embodiment, the pusher members may comprise upright pins or plates or crossbars.

In accordance with another aspect of the invention, a tray filling and sealing system comprises a transport system according to the first aspect of the invention adapted to transport trays; a tray filling system upstream of the weighing system and a tray sealing system downstream of the weighing system, the transport system being operable to transport trays from the tray filling system via the weighing system to the tray sealing system.

Two examples of transport system according to the invention will now be described with reference to the accompanying drawings, in which:—

FIG. 1 is a side elevation of a first example of the transport system;

FIG. 2 is a plan of the first example of the weighing system of the transport system shown in FIG. 1;

FIG. 3 is a side elevation of the first example of weighing system shown in FIG. 2; and, FIG. 4 is a side elevation of part of a second example of the transport system having a different weighing system to the first example.

The transport system shown in FIG. 1 is based on the Ishida Tray Sealer and comprises a pair of laterally spaced, elongate chains (not shown) on which are mounted pusher members in the form of pins. The chains are mounted on a frame 10 which extends from a tray loading area 12 in which open topped trays 14 are manually loaded onto the chains. Of course, an automatic tray loader could also be provided. The chains then pass horizontally along the frame 10 so as to carry trays 14 through a weighing station 16 and a reject point 18 where trays which fail the weight test are ejected from the chains. The trays 12 then pass to a collation area 20 where they are collated together in groups which are then transferred into a sealing station 22 for sealing plastics covers onto the previously open trays. The sealed trays then pass out of the sealing station to an out feed location 24. As the trays 14 are moved along the transport path by the pusher members, they are supported by at least two laterally spaced support bars (not shown).

The weighing station 16 is shown in more detail in FIGS. 2 and 3. As can be seen in FIG. 2, the frame 10 has a pair of opposed side walls 10A,10B between which the chains extend. The weighing station 16 has a pair of weighing units 30,32 of identical construction and so the construction of the weighing unit 30 only will be described here. The weighing unit 30 has a platform 34 including four elongate platform members 36A-36D laterally spaced across the width of the conveying path. Each member 36A-36D has a first, depending leg 38 fixed to a shaft 40 which is journalled between apertures 42 in opposed triangular plates 44.

A second aperture 46 of one of the plates 44 is pivotally mounted to an L-shaped arm 48 and coupled for rotary drive to a pneumatically operated cylinder 50.

Each member 36A-36D has a second, depending leg 52 fixed to a shaft 54 which is journalled between openings 56 in second triangular plates 58. A second, lower aperture 60 in each plate 58 is pivotally mounted to the arm 48.

The endmost pairs of plates 44,58 have upper apertures 45,59 which are connected by a link 61 so that the plate 58 is rotated upon rotation of the plate 44.

Each platform 34 is movable between a retracted position (as shown for the weighing unit 32) in which the platform 34 is beneath the upper run of the chains and the support bars and an extended or weighing position (as shown for the weighing unit 30) in which the platform 34 is above the upper run of the chains and the support bars. This movement is achieved by suitably rotating the cylinders 50 in a clockwise direction (to move to the weighing position) and an anti-clockwise direction (to move to the retracted position). It will further be noted that this movement includes not only a vertical component but also a horizontal component. Thus, as the platform 34 is moved from its retracted position to its weighing position, it will move a small distance horizontally in the direction of tray travel. It has been found that a vertical movement of no more than 10-15 mm is sufficient accompanied by a horizontal movement of 7-12 mm. Lift operation takes around 100 ms. Operation is started before the chain comes to a stop, to allow for inherent delays in pneumatic operation, thus optimising the weighing cycle. This enables the dwell time of the conveyor to be as small as possible.

The horizontal movement enables the tray carried on the platform to be moved away from the adjacent pusher members so as to minimize the risk of interference between the pusher members and the tray although the pusher members still protrude above the level of the platform when in its weighing position.

Each arm 48 is supported on a respective load cell 70, the load cells being mounted on a fixed framework 72. The load cells 70 measure the weight of a tray on the platforms 34 when in the weighing position.

Each platform 34 is designed to accommodate a single tray so that when it is moved to its weighing position, the tray weight can be detected by the corresponding load cell. By having two weighing units 30,32, it is possible to weigh two trays at the same time.

As in conventional systems, once a tray has been weighed, if its weight falls within an acceptable limit it then passes to the collation area 20 but otherwise will be rejected through the rejection point 18.

FIG. 4 shows part of a second example of the transport system, which has a different weighing system to that of the first example shown in FIGS. 1 to 3. The systems of the two examples are otherwise identical. The weighing system shown in FIG. 4 is adapted for use with a continuous motion transport system.

FIG. 4 shows one of a pair of transport chains 80 to which are attached a plurality of pusher members 81. In this case, the pusher members 81 are in the form of upright pins, although they could be plates or crossbars. Each pusher member 81 is capable of pushing a tray along the transport path. As in the example of FIGS. 1 to 3, the trays are supported as they proceed along the transport path by at least two support bars (not shown), which extend along the transport path parallel to the transport chains 80.

The weighing system of the transport system of FIG. 4 comprises a fixed conveyor 82 supported by a load cell 83. Thus, any load borne by the fixed conveyor 82 is transferred to the load cell 83, which can thereby detect the weight of the load on the fixed conveyor 82.

The fixed conveyor 82 comprises at least two endless belts 84 entrained around respective rollers 85 and 86. The endless belts 84 and respective rollers 85 and 86 are laterally spaced such that the transport chains 80 can pass through the lateral spaces between them. Similarly, the support bars also extend through these lateral spaces. Each of the rollers 85 is mounted on the same shaft 85a, and each of the rollers 86 is mounted on the same shaft 86a. This arrangement allows the surface of the endless belts 84 to rise above the transport chains 80 and support bars without impeding the passage of the transport chains 80 and support bars along the transport path.

The shaft 86a is coupled via a drive belt 87 to a drive shaft 88, which is in turn coupled to a drive motor (not shown). The drive motor operates continuously and drives the endless belts 84 via drive belts 87, shaft 86a and rollers 86 continuously in the direction of transport. The speed at which the endless belts run is adapted to be slightly faster than the speed at which the transport chains advance in the direction of transport. The combination of this slightly increased speed and the slightly higher elevation of the surface of endless belts 84 with respect to the transport chains 80 and support bars means that as a pusher member pushes a tray onto the endless belt 84, the endless belt 84 pulls the tray away from the pusher member 81 and above the level of the transport chains 80 and support bar. Therefore, the tray is supported entirely by the fixed conveyor 82 and its weight can be reliably detected by load cell 83. When the tray reaches the other end of endless belt 84 it will simply wait for the pusher member to catch up before proceeding further along the transport path.

By operating the fixed conveyor 82 continuously as described, it is possible to perform weighing of articles whilst conveying them in the direction of transport. Since there is no dwell time during weighing such as would be required in an intermittently operated system, a more efficient process is achieved.

The invention claimed is:

1. A tray filling and sealing system, comprising:
  a transport system configured to transport trays, the transport system including:
    a plurality of pusher members coupled to a control mechanism for moving the pusher members along the transport path;
    a fixed support extending along the transport path for supporting trays as they are pushed by the pusher members; and
    a weighing system including a weighing member supported on a weight detection device, wherein the weighing member is adapted to transfer a tray from the support to the weighing member and out of contact with the pusher members by movement of the weighing member relative to the support between a rest position below the support and a weighing position in which it protrudes above the support so as to lift a tray off the support; and
    a weighing member moving system configured to move the weighing member with both vertical and forward direction components, with respect to the direction of movement of the pusher members, as it is moved from the rest position to the weighing position;
  a tray filling system upstream of the weighing system; and
  a tray sealing system downstream of the weighing system, the transport system being operable to transport trays from the tray filling system via the weighing system to the tray sealing system.

2. A system according to claim 1, wherein the weighing member moving mechanism comprises one or more arms pivotally mounting the weighing member to a base member.

3. A system according to claim 1 or 2, wherein the weighing member comprises a platform.

4. A system according to claim 1 or 2, wherein the amount of relative movement between the weighing member and the support is not more than 15 mm.

5. A system according to claim 1 or 2, wherein the control mechanism is adapted to move the pusher members intermittently.

6. A system according to claim 1 or 2, wherein the control mechanism is adapted to move the pusher members continuously.

7. A system according to claim 1 or 2, wherein the weight detection device comprises a load call and a strain gauge.

\* \* \* \* \*